US011999346B2

(12) United States Patent
Weiss et al.

(10) Patent No.: US 11,999,346 B2
(45) Date of Patent: *Jun. 4, 2024

(54) METHOD AND APPARATUS FOR CONTROLLING A SAFETY DEVICE OF A VEHICLE, AND SAFETY SYSTEM FOR A VEHICLE (71) Applicant: Robert Bosch GmbH, Stuttgart (DE)

(72) Inventors: Christian Weiss, Leonberg (DE); Gyorgy Csaba, Budapest (HU); Heiko Kirn, Bietigheim-Bissingen (DE); Nina Braunert, Leonberg-Warmbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 338 days.

This patent is subject to a terminal disclaimer.

(21) Appl. No.: 17/453,428

(22) Filed: Nov. 3, 2021

(65) Prior Publication Data
US 2022/0144254 A1    May 12, 2022

(30) Foreign Application Priority Data

Nov. 9, 2020  (DE) ..................... 10 2020 214 031.6

(51) Int. Cl.
B60W 30/09     (2012.01)
B60W 10/18     (2012.01)
(Continued)

(52) U.S. Cl.
CPC ............ B60W 30/09 (2013.01); B60W 10/18 (2013.01); B60W 10/20 (2013.01);
(Continued)

(58) Field of Classification Search
CPC ...... B60W 30/09; B60W 10/18; B60W 10/20; B60W 30/0956; B60W 50/0097; B60W 2554/4041; B60W 2554/4043
(Continued)

(56) References Cited

U.S. PATENT DOCUMENTS 4,491,840 A *  1/1985  Nishikawa ............. B60Q 9/008
                                                367/909
6,031,484 A *  2/2000  Bullinger .............. G01S 13/931
                                                342/72
(Continued)

FOREIGN PATENT DOCUMENTS

DE       60303577 T2     8/2006
DE     102011115875 A1   4/2013
(Continued)

OTHER PUBLICATIONS

Choi et al., On-Road Object Collision Point Estimation by Radar Sensor Data Fusion, Sep. 2022 IEEE, vol. 23 No. 9, pp. 14753-14763.*

Primary Examiner — Manglesh M Patel
(74) Attorney, Agent, or Firm — NORTON ROSE FULBRIGHT US LLP; Gerard A. Messina (57) ABSTRACT A method for controlling a safety device of a vehicle. The safety device reacts to an imminent collision by an intervention in a guidance of the vehicle. Environment data and trip data regarding the collision object and the vehicle, and intervention data regarding a planned intervention of the safety device, are read in. First and second expected impingement points of the collision object on the vehicle are ascertained; an uncertainty value of the impingement points is ascertained; and a probability value for a location of at least one of the impingement points relative to subregions referred to the vehicle, is ascertained using the uncertainty value. An evaluation of a location of the impingement points relative to the subregions is executed using the at least one probability value and reference data. S control signal for controlling the safety device is generated depending on a result of the evaluation.

9 Claims, 4 Drawing Sheets (51) Int. Cl.
*B60W 10/20* (2006.01)
*B60W 30/095* (2012.01)
*B60W 50/00* (2006.01)

(52) U.S. Cl.
CPC .... *B60W 30/0956* (2013.01); *B60W 50/0097* (2013.01); *B60W 2554/4041* (2020.02); *B60W 2554/4043* (2020.02)

(58) Field of Classification Search
USPC .......................................................... 701/301
See application file for complete search history.

(56) References Cited

U.S. PATENT DOCUMENTS

| | | | | |
|---|---|---|---|---|
| 6,087,928 | A * | 7/2000 | Kleinberg | B60R 21/013 |
| | | | | 340/904 |
| 6,256,564 | B1 * | 7/2001 | Miyaguchi | B60R 21/0133 |
| | | | | 701/45 |
| 6,269,307 | B1 * | 7/2001 | Shinmura | G01S 13/931 |
| | | | | 340/436 |
| 7,986,261 | B2 * | 7/2011 | Harada | B60R 21/0134 |
| | | | | 342/107 |
| 9,199,643 | B1 * | 12/2015 | Zeng | G01S 13/726 |
| 9,517,767 | B1 * | 12/2016 | Kentley | B60W 10/30 |
| 9,555,781 | B2 * | 1/2017 | Breuer | B60W 50/16 |
| 10,543,838 | B2 * | 1/2020 | Kentley-Klay | G06F 3/04842 |
| 10,745,003 | B2 * | 8/2020 | Kentley-Klay | B60W 30/0953 |
| 2003/0149530 | A1 * | 8/2003 | Stopczynski | G08G 1/165 |
| | | | | 340/436 |
| 2005/0104721 | A1 * | 5/2005 | Mae | B60R 21/0136 |
| | | | | 340/436 |
| 2009/0259402 | A1 * | 10/2009 | Gates | G08G 3/02 |
| | | | | 701/301 |
| 2015/0266473 | A1 * | 9/2015 | Hayasaka | B60W 30/09 |
| | | | | 701/70 |
| 2016/0328974 | A1 * | 11/2016 | Yoshizawa | B60W 30/095 |
| 2017/0263127 | A1 * | 9/2017 | Auden | G08G 1/165 |
| 2017/0294124 | A1 * | 10/2017 | Baba | G01S 15/06 |
| 2017/0300780 | A1 * | 10/2017 | Baba | G06F 18/22 |
| 2018/0261094 | A1 * | 9/2018 | Nishimura | G08G 1/16 |
| 2019/0092324 | A1 * | 3/2019 | Kim | B60W 30/0956 |
| 2019/0243371 | A1 * | 8/2019 | Nister | G05D 1/0223 |
| 2020/0050536 | A1 * | 2/2020 | Nygaard | G06F 11/3684 |
| 2020/0130683 | A1 * | 4/2020 | Oguri | B60R 21/00 |
| 2020/0189573 | A1 * | 6/2020 | King | G06V 20/58 |
| 2020/0211394 | A1 * | 7/2020 | King | G06V 20/58 |
| 2021/0009147 | A1 * | 1/2021 | Maag | G01S 13/931 |
| 2021/0331673 | A1 * | 10/2021 | Zhang | B60W 30/09 |
| 2022/0144253 | A1 * | 5/2022 | Weiss | B60W 30/09 |
| 2022/0144262 | A1 * | 5/2022 | Weiss | B60W 10/18 |
| 2022/0144263 | A1 * | 5/2022 | Weiss | B60W 30/0953 |
| 2022/0144264 | A1 * | 5/2022 | Weiss | B60W 40/109 |
| 2022/0363246 | A1 * | 11/2022 | Lang | B60W 40/08 |

FOREIGN PATENT DOCUMENTS

| | | |
|---|---|---|
| DE | 102012021004 A1 | 4/2014 |
| DE | 102016201522 A1 | 8/2017 |

\* cited by examiner

METHOD AND APPARATUS FOR CONTROLLING A SAFETY DEVICE OF A VEHICLE, AND SAFETY SYSTEM FOR A VEHICLE

CROSS REFERENCE

The present application claims the benefit under 35 U.S.C. § 119 of German Patent Application No. DE 102020214031.6 filed on Nov. 9, 2020, which is expressly incorporated herein by reference in its entirety.

FIELD

The present invention relates to an apparatus and a method for controlling a safety device of a vehicle. A further subject of the present invention is a computer program.

BACKGROUND INFORMATION

Driver assistance systems that can perform automatic emergency braking of a vehicle as an intervention in the case of an acute risk of collision with one or several other traffic participants are, for example, conventional. In such an intervention a displacement of an impingement point, to be expected without the intervention, of another traffic participant on the vehicle into an undesired region of the vehicle can occur in some circumstances.

SUMMARY

The present invention provides a method, also an apparatus that uses that method, and a corresponding computer program, for controlling a safety device of a vehicle. The features disclosed herein make possible advantageous refinements of and improvements to the apparatus disclosed herein.

In accordance with example embodiments of the present invention, in particular in the context of an imminent collision of a vehicle with a collision object, an impingement point and a possible displacement of the impingement point with consideration of an intervention of a safety device or of an assistance function of the vehicle can be determined, and can be used to control the safety device. For example, the impingement point and possible displacement of the impingement point can be predicted for consideration in the context of activation of an autonomous emergency braking (AEB) system for side impact scenarios or the like. In other words, a collision point of a collision object on the host vehicle can, in particular, be determined or predicted as a basis for an activation decision of a safety device, in particular an autonomous safety device. For this, for example, a detection of the expected collision point can be carried out and an ascertainment can be made as to whether and how that collision point will be displaced to a favorable or unfavorable position by a planned intervention of the safety device, in particular by adapting a velocity or trajectory of the host vehicle in the event of an autonomous braking or acceleration operation, or in the case of an autonomous evasive maneuver.

In accordance with an example embodiment of the present invention, in particular, an uncertainty of an impingement point of two vehicles involved in a collision can be estimated. For example, the uncertainty of the data of the host vehicle and of the data of the target object or collision object, and possible changes in the behavior of the collision object, can be considered. Based on the uncertainty of an estimated impingement point, it is possible to determine a probability that specified regions of the host vehicle, or subregions referred to the vehicle, will be impinged upon. Using this additional knowledge, decisions that are advantageous for occupant safety can be made. Uncertainties of impingement points or probabilities of their location in respective vehicle regions can be used, for example, to decide whether displacements of the impingement points are to be taken into consideration for suppression of a system reaction. If the uncertainty is small and/or the probability of impingement on a specified region, compared with other regions, is high, the displacement of the impingement point can, for example, be taken into consideration. If the uncertainty is large and/or the probabilities for several vehicle regions are similar, a decision can be made, for example, to ignore the displacement of the impingement point and to permit the system reaction. If the system reaction is constituted by an emergency braking operation, this can reduce the collision energy; this is advantageous.

Advantageously, in accordance with embodiments of the present invention, in particular an improvement in occupant safety in vehicle collisions can be made possible by using uncertainties with regard to predicted impingement points. Depending on a nature of the planned intervention or activated reaction pattern, for example a length and an intensity of an autonomous braking intervention or evasive maneuver, the collision can be avoided or the impingement point can be displaced along a contour of the host vehicle, for example, in the case of a reduction in the velocity of the host vehicle because of a time gain that results in a later arrival in a collision zone. In particular, an accident attenuation can be achieved by a reduction in the velocity of the host vehicle, in which context a collision point can be displaced, by the intervention of the safety device, for example, from a rear side region to a front side region or to a central front region of the host vehicle. In accordance with embodiments, a worsening of an accident sequence due to an intervention by the safety device can, in particular, also be avoided, by the fact that in the context of an expected displacement of the collision point into the region of the passenger compartment of the host vehicle, the planned intervention can be prevented even if a reduction in the velocity of the host vehicle thereby fails to occur. For example, in particular, a direct impact onto the passenger compartment of the vehicle, with possibly more-serious injuries to the occupants, can be reliably prevented. In particular, an advantageous modification of the collision region on the vehicle, and if applicable of the entire collision event, can be made possible by displacing the impingement point by suitable application of control to the safety device.

In accordance with an example embodiment of the present invention, a method for controlling a safety device of a vehicle is provided, the safety device being embodied to react to an imminent collision of the vehicle with a collision object by way of an intervention in a longitudinal and/or lateral guidance of the vehicle, the method having the following steps:

reading in, from an interface to at least one environment sensor of the vehicle, environment data regarding a position, a velocity and, additionally or alternatively, an acceleration of the collision object in an environment of the vehicle; from an interface to at least one trip data sensor of the vehicle, trip data regarding a position, a velocity and, additionally or alternatively, an acceleration of the vehicle; and from an interface to the safety device, intervention data regarding a planned intervention of the safety device;

ascertaining: a first expected impingement point of the collision object on the vehicle using the environment data and the trip data; a second expected impingement point of the collision object on the vehicle using the environment data, the trip data, and the intervention data; at least one uncertainty value of the impingement points using the environment data and the trip data; and at least one probability value for a location of at least one of the impingement points relative to subregions referred to the vehicle, using the at least one uncertainty value;

executing an evaluation of a location of the first expected impingement point and of a location of the second expected impingement point relative to the subregions, using the at least one probability value and reference data that define, for each subregion, an evaluation factor that depends on an effect of the location of an expected impingement point in the subregion on a safety status of at least one occupant of the vehicle; and generating, depending on a result of the evaluation, a control signal for output to an interface to the safety device, the control signal having at least one control parameter for controlling the safety device.

This method can be implemented, for example, in software or hardware or in a mixed form of software and hardware, for example in a control device or an apparatus. The vehicle can be a motor vehicle, in particular a passenger car or the like. The safety device can be embodied to bring about an autonomous emergency braking operation and, additionally or alternatively, an autonomous evasive maneuver of the vehicle. The collision object can be an external vehicle or a stationary object or obstacle. The environment data can be vehicle-related detected data. The at least one environment sensor can encompass, for example, a camera, a radar device and, additionally or alternatively, a lidar sensor of the vehicle. The intervention data can represent information regarding a planned duration and/or a planned amplitude of an activation of a braking system, a steering system, a transmission and, additionally or alternatively, an engine of the vehicle. The first expected impingement point can represent an impingement point in the absence of the planned intervention. The second expected impingement point can represent an impingement point with consideration of the planned intervention. The at least one uncertainty value can be ascertained using a quality datum that can be read in with the environment data and the trip data. The at least one uncertainty value can represent a statistical statement regarding an accuracy, reliability, and/or robustness of the environment data and/or trip data. The at least one probability value can encompass a plurality of individual values and, additionally or alternatively, a probability distribution. Each evaluation factor can be predefined on the basis of measurements, experiments and, additionally or alternatively, statistical methods. Each evaluation factor can represent an expected injury severity for occupants in the context of a location of an impingement point in the pertinent subregion. A subregion can encompass a sub-portion of the vehicle and, additionally or alternatively, a region, adjacent to a sub-portion of the vehicle, of an environment of the vehicle. The at least one control parameter can represent a duration and/or an amplitude of an activation of a braking system, a steering system, a transmission and, additionally or alternatively, an engine of the vehicle.

In accordance with an embodiment of the present invention, reference data that define, for at least one subregion in the region of a passenger compartment of the vehicle, a first evaluation factor that represents an effect having a first damage potential, and define, for at least one subregion outside a region of the passenger compartment, a second evaluation factor that represents an effect having a second damage potential, can be used in the executing step. The first damage potential can be greater than the second damage potential. A damage potential can be occupant-related and, additionally or alternatively, vehicle-structure-related. An embodiment of this kind offers the advantage that a decision regarding activation or deactivation of the intervention of the safety device can be made in simple, reliable, and exact fashion.

In accordance with an example embodiment of the present invention, reference data whose evaluation factors depend on a collision-related deformation of a sub-portion of the vehicle in at least one of the subregions can also be used in the executing step. The deformation can be defined as a vehicle deformation index (VDI, in particular VDI3). An embodiment of this kind offers the advantage of making possible a reliable statement as to which impingement point location is to be assumed to be less harmful for occupants.

In accordance with an example embodiment of the present invention, in the generating step, the control signal can furthermore be generated with at least one control parameter that brings about an enabling or a suppression of the planned intervention of the safety device. For example, an enabling of the planned intervention can be brought about if the location of the second expected impingement point is in a subregion whose evaluation factor is more favorable for safety than a further evaluation factor of a further subregion having the location of the first expected impingement point. For example, a suppression of the planned intervention can be brought about if the location of the first expected impingement point is in a subregion whose evaluation factor is more favorable for safety than a further evaluation factor of a further subregion having the location of the second expected impingement point. An advantageous displacement of the impingement point into a subregion that is less objectionable for safety can thereby be made possible by enabling or suppressing the planned intervention.

Additionally or alternatively, in the generating step the control signal can be generated with at least one control parameter that brings about a modification of the planned intervention of the safety device. A modified intervention of the safety device can be brought about in this context. The control signal can be generated using a result of an evaluation in which a location of a third expected impingement point that results in the context of the modified intervention is evaluated. An embodiment of this kind offers the advantage that the location of an expected impingement point can be optimized even when the first expected impingement point and the second expected impingement point happen to be unfavorably located.

In addition, in the generating step the control signal can be generated with at least one control parameter that brings about control of a duration and, additionally or alternatively, of an amplitude of the planned intervention. An embodiment of this kind offers the advantage that the safety device can be controlled in simple, reliable, and accurate fashion.

The present invention furthermore provides an apparatus that is embodied to carry out, control, or implement, in corresponding devices, the steps of a variant of a method disclosed herein. The object on which the present invention is based can also be quickly and efficiently achieved by this variant embodiment of the present invention in the form of an apparatus.

For this, the apparatus can have at least one computation unit for processing signals or data, at least one storage unit for storing signals or data, at least one interface to a sensor or an actuator for reading in sensor signals from the sensor or for outputting data signals or control signals to the actuator, and/or at least one communication interface for reading in or outputting data that are embedded in a communication protocol. The computation unit can be, for example, a signal processor, a microcontroller, or the like; the memory unit can be a flash memory, an EEPROM, or a magnetic storage unit. The communication interface can be embodied to read in or output data wirelessly and/or in wire-based fashion; a communication interface that can read in or output wire-based data can, for example, electrically or optically read in those data from a corresponding data transfer line or output them into a corresponding data transfer line.

An "apparatus" can be understood in the present case as an electrical device that processes sensor signals and, depending thereon, outputs control signals and/or data signals. The apparatus can have an interface that can be embodied in hardware- and/or software-based fashion. With a hardware-based embodiment the interfaces can be, for example, part of a so-called "system ASIC" that contains a wide variety of functions of the apparatus. It is also possible, however, for the interfaces to be independent integrated circuits or to be made up at least in part of discrete components. With a software-based embodiment, the interfaces can be software modules that are present, for example, on a microcontroller alongside other software modules.

In an advantageous embodiment of the present invention, the apparatus controls a safety device of the vehicle for occupant protection. The apparatus can access for that purpose, for example, sensor signals or sensor data such as environment data, trip data, and intervention data. Control is applied using the control signal by way of the safety device via actuators that are associated with a braking system, a steering system, a transmission and, additionally or alternatively, an engine of the vehicle.

A safety system for a vehicle is also provided. In accordance with an example embodiment of the present invention, the safety system has the following features:
  an embodiment of the apparatus described above; and
  the safety device, the safety device and the apparatus being signal-transferringly connected to one another.

In the context of the safety system, an embodiment of the apparatus described above can advantageously be used or utilized to control the safety device, in particular in the context of a recognized imminent collision. The vehicle in which the safety system is installed can also be referred to as a "host vehicle." An external vehicle constituting a collision object can also be referred to as a "target vehicle."

Also advantageous is a computer program product or computer program having program code that can be stored on a machine-readable medium or storage medium such as a semiconductor memory, a hard-drive memory, or an optical memory, and can be used to carry out, implement, and/or control the steps of the method in accordance with one of the embodiments described above, in particular when the program product or program is executed on a computer or an apparatus.

Exemplifying embodiments of the present invention are explained in further detail in the description below and are shown in the figures.

DETAILED DESCRIPTION OF EXAMPLE EMBODIMENTS

Before exemplifying embodiments of the present invention are described below in more detail, the background and principles of exemplifying embodiments will first be briefly discussed.

In active safety systems such as the safety system presented here, information from environment sensors, for instance radar or video, and an inherent motion, can be used to draw conclusions as to the criticality of a traffic situation. Because of viewing angle limitations of available systems for active safety, which are often equipped with front sensors having a limited viewing angle, the focus is, for example, on accidents involving traffic moving in longitudinally or slowly from the side. In such accidents, an opposing traffic participant collides primarily with a front region of the host vehicle, regardless of whether the system does or does not activate. Systems that use additional sensors, or sensors having no relevant limitations on the viewing angle, for instance corner radar sensors, can also react to traffic moving in rapidly from the side. Such application instances in the context of cross traffic are characterized in that collisions happen more frequently in the side region of the host vehicle.

A front cross traffic assist (FCTA) function can encompass, for example, the following reaction pattern:
  Visual information that informs a driver of approaching cross traffic if the host vehicle is, for example, stationary at an intersection with poor visibility because of a viewing impediment.
  Preventing the host vehicle from starting to move, if a collision is imminent due to initial movement and driving into the travel path of the cross traffic.
  Activation of suspension stiffening.
  Increased brake-system pressure to move the brake pads against the brake disc, so-called "prefill."
  Optionally: braking assistance triggered by the driver which generates additional brake pressure if necessary as emergency braking assistance.
  Autonomous emergency braking, partial or complete, in the case of a detected imminent collision with cross traffic.
  Optionally: activation of passive safety systems, for instance airbags, if a collision was unavoidable; activation of autonomous emergency steering (AES) to optimize a collision orientation.

For example, a location of an impingement point may not be exactly estimated or ascertained for the following reasons: an uncertainty can exist in input data for the ascertainment; in particular, the measured state of the host vehicle can be uncertain, for instance in terms of velocity, acceleration, etc.; and/or the measured state of the target vehicle or collision object can be uncertain, for instance in terms of relative position and relative velocity with respect to the host vehicle. An uncertainty can exist with regard to future changes in the behavior of the target vehicle or collision object. In accordance with exemplifying embodiments, the uncertainty of an ascertained impingement point can be taken into account. This can improve performance or performance capability in terms of occupant protection.

In the description below of useful exemplifying embodiments of the present invention, identical or similar reference characters are used for elements that are depicted in the various Figures and function similarly, repeated description of those elements being omitted.

Figure 1:
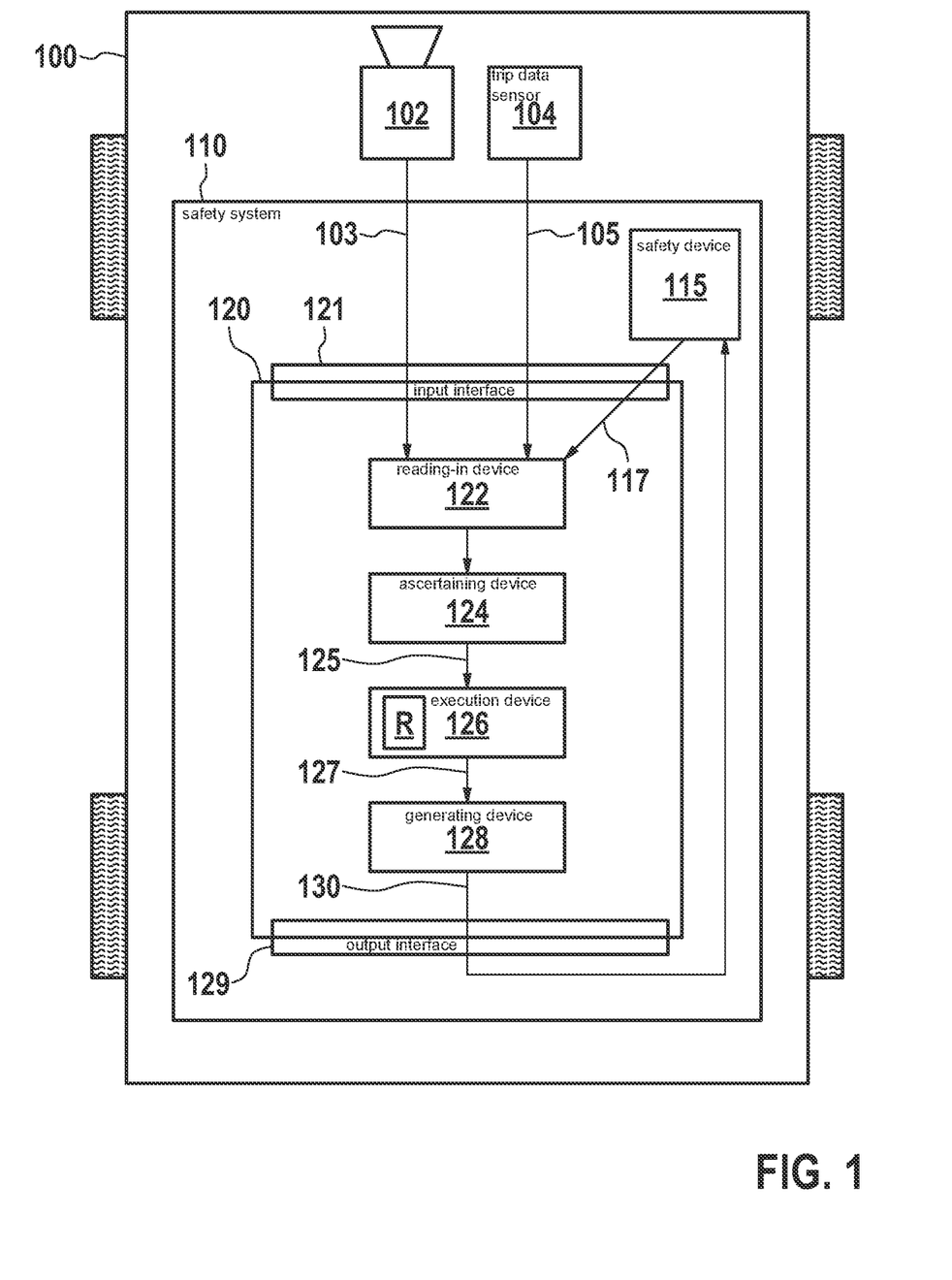
FIG. 1 schematically depicts a vehicle having a safety system, in accordance with an exemplifying embodiment of the present invention.

FIG. 1 schematically depicts a vehicle 100 having a safety system 110, in accordance with an exemplifying embodiment. Vehicle 100 is a motor vehicle, for example a passenger car. All that is shown of vehicle 100 in the depiction of FIG. 1 by way of example is an environment sensor 102, a trip data sensor 104, and safety system 110. Safety system 110 is embodied to execute or bring about an autonomous emergency braking operation and/or an autonomous evasive maneuver of vehicle 100 in the event of an imminent collision of vehicle 100 with a collision object.

Environment sensor 102 is embodied to detect an environment of vehicle 100. More precisely, environment sensor 102 is embodied to detect a position, a velocity, and/or an acceleration of the collision object in the environment of vehicle 100. Environment sensor 102 is further embodied to furnish environment data 103 that represent the detected position, velocity, and/or acceleration of the collision object. Environment sensor 102 is also embodied, for example, to furnish, together with environment data 103, a quality datum that indicates a quality of environment data 103.

Trip data sensor 104 is embodied to detect trip data 105 of vehicle 100. More precisely, trip data sensor 104 is embodied to detect, as trip data 105, a position, a velocity, and/or an acceleration of vehicle 100. Trip data sensor 104 is furthermore embodied to furnish trip data 105. Trip data sensor 104 is also embodied, for example, to furnish, together with trip data 105, a quality datum that indicates a quality of trip data 105.

Safety system 110 encompasses a safety device 115 and an apparatus 120 for controlling safety device 115. Safety device 115 and apparatus 120 are signal-transferringly connected to one another. Safety system 110, more precisely apparatus 120, is signal-transferringly connected to environment sensor 102 and to trip data sensor 104. Safety device 115 is embodied to react, by way of an intervention in a longitudinal and/or transverse guidance of vehicle 100, to an imminent collision of vehicle 100 with a collision object. Safety device 115 is also embodied to furnish intervention data 117 regarding a planned intervention of safety device 115. Apparatus 120 can also be referred to as a "control apparatus" or "control device."

Apparatus 120 encompasses an input interface 121, a reading-in device 122, an ascertaining device 124, an execution device 126, a generating device 128, and an output interface 129. Reading-in device 122 is embodied to read in environment data 103, optionally with the pertinent quality datum, trip data 105, optionally with the pertinent quality datum, and intervention data 117 from input interface 121. Apparatus 120 is signal-transferringly connected via input interface 121 to environment sensor 102, to trip data sensor 104, and to safety device 115. Reading-in device 122 is also embodied to forward the read-in data to ascertaining device 124. Ascertaining device 124 is embodied to ascertain, using environment data 103 and trip data 105, a first expected impingement point of the collision object on vehicle 100. Ascertaining device 124 is further embodied to ascertain, using environment data 103, trip data 105, and intervention data 117, a second expected impingement point of the collision object on vehicle 100. Ascertaining device 124 is furthermore embodied to ascertain, using environment data 103 and trip data 105, optionally also using the pertinent quality datum, at least one uncertainty value of the impingement points and, using the at least one uncertainty value, to ascertain at least one probability value for a location of at least one of the impingement points relative to subregions referred to vehicle 100. Ascertaining device 124 is also embodied to forward ascertained data 125, which represent the ascertained first expected impingement point, the ascertained second expected impingement point, the at least one uncertainty value, and the at least one probability value, to execution device 126.

Execution device 126 is embodied to receive ascertained data 125 from ascertaining device 124. Execution device 126 is embodied to execute, using the at least one probability value and reference data R, an evaluation of a location of the first expected impingement point and of a location of the second expected impingement point relative to subregions referred to vehicle 100. Reference data R define, for each subregion, an evaluation factor that depends on an effect of the location of an expected impingement point in the subregion on a safety status of at least one occupant of vehicle 100. Execution device 126 is also embodied to forward result data 127, which represent a result of the evaluation, to generating device 128. Generating device 128 is embodied to generate, depending on the result of the evaluation, a control signal 130 for output to output interface 129 to safety device 115. Control signal 130 encompasses at least one control parameter for controlling safety device 115. Apparatus 120 is embodied to output control signal 130 to output interface 129 to safety device 115.

In accordance with an exemplifying embodiment, execution device 126 is embodied to use reference data R, which define for at least one subregion in the region of a passenger compartment of vehicle 100 a first evaluation factor that represents an effect having a first damage potential, and define for at least one subregion outside a region of the passenger compartment a second evaluation factor that represents an effect having a second damage potential. The first damage potential is greater than the second damage potential. In particular, execution device 126 is embodied to use reference data R whose evaluation factors depend on a collision-related deformation of a sub-portion of vehicle 100 in at least one of the subregions.

In accordance with an exemplifying embodiment, generating device 128 is embodied to generate control signal 130 with at least one control parameter that brings about an enabling or a suppression of the planned intervention of safety device 115. Additionally or alternatively, generating device 128 is embodied to generate control signal 130 with at least one control parameter that brings about a modification of the planned intervention of safety device 115. In particular, generating device 128 is embodied to generate control signal 130 with at least one control parameter that brings about control of a duration and/or an amplitude of the planned intervention.

Figure 2:
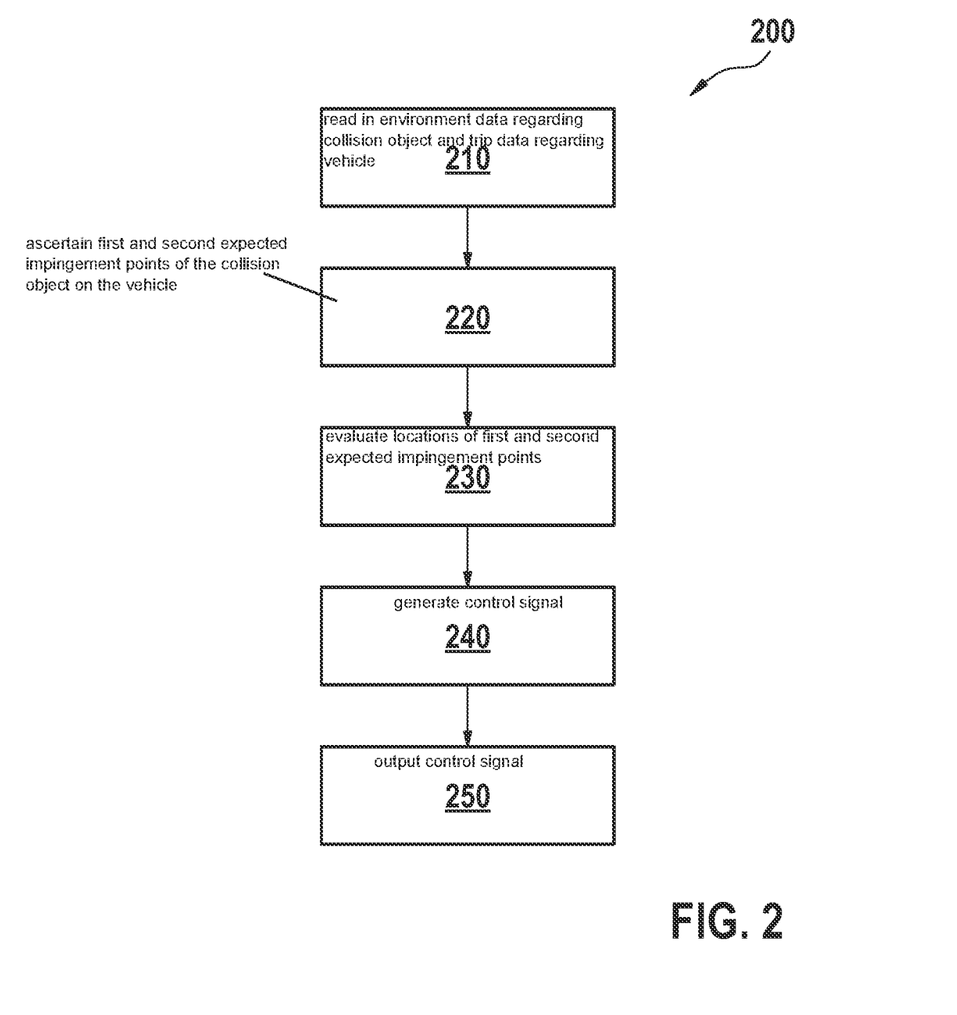
FIG. 2 is a flow chart for a control method, in accordance with an exemplifying embodiment of the present invention.

FIG. 2 is a flow chart of a control method 200, in accordance with an exemplifying embodiment. Control method 200 is executable in order to control a safety device of a vehicle. Control method 200 is executable in order to control the safety device of FIG. 1 or a similar safety device.

Control method 200 is also executable using the apparatus of FIG. 1 or a similar apparatus. Control method 200 encompasses a reading-in step 210, an ascertaining step 220, an executing step 230, and a generating step 240. An outputting step 250 is additionally shown.

In reading-in step 210, environment data regarding a position, a velocity, and/or an acceleration of the collision object in an environment of the vehicle are read in from an interface to at least one environment sensor of the vehicle. In addition, in reading-in step 210 trip data regarding a position, a velocity, and/or an acceleration of the vehicle are read in from an interface to at least one trip data sensor of the vehicle. In reading-in step 210, intervention data regarding a planned intervention of the safety device are also read in from an interface to the safety device.

In ascertaining step 220, a first expected impingement point of the collision object on the vehicle is then ascertained using the environment data and the trip data. A second expected impingement point of the collision object on the vehicle is also ascertained in ascertaining step 220 using the environment data, the trip data, and the intervention data. At least one uncertainty value of the impingement points is also ascertained in ascertaining step 220 using the environment data and the trip data. At least one probability value for a location of at least one of the impingement points relative to subregions referred to the vehicle is also ascertained in ascertaining step 220 using the at least one uncertainty value. An evaluation of a location of the first expected impingement point and of a location of the second expected impingement point, relative to subregions referred to the vehicle, is then in turn executed in executing step 230 using the at least one probability value and reference data. The reference data define, for each subregion, an evaluation factor that depends on an effect of the location of an expected impingement point in the subregion on a safety status of at least one occupant of the vehicle. In generating step 240, a control signal for output to an interface to the safety device is then generated depending on a result of the evaluation executed in executing step 230. The control signal encompasses at least one control parameter for controlling the safety device.

In accordance with an exemplifying embodiment, control method 200 also encompasses outputting step 250. In outputting step 250, the control signal generated in generating step 240 is outputted to the interface to the safety device.

Figure 3:
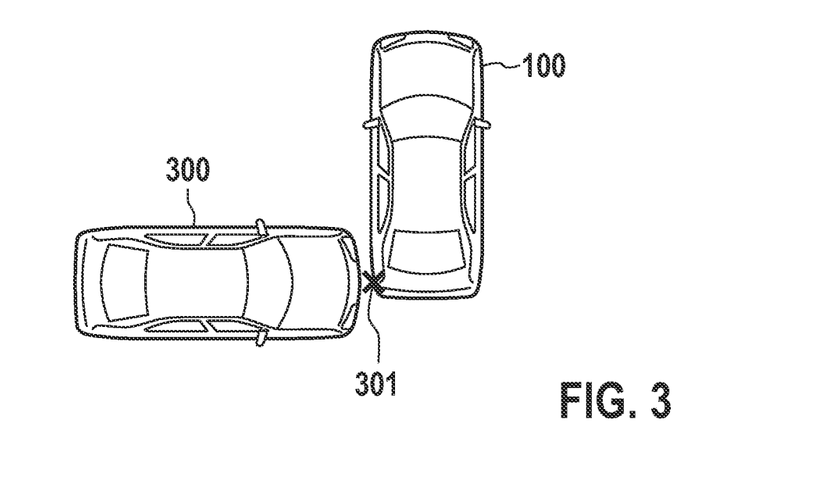
FIG. 3 schematically depicts an impingement point of a collision object on a vehicle, in accordance with an exemplifying embodiment of the present invention.

FIG. 3 schematically depicts an actual impingement point 301 of a collision object 300 on a vehicle 100, in accordance with an exemplifying embodiment. If the safety system of FIG. 1 does not trigger a system reaction or an intervention, the impingement point or actual impingement point can be located at the rear side portion of host vehicle 100 (trunk); and in the event of an intervention or a system reaction involving braking, the impingement point can be located at the passenger compartment. An impingement point at the passenger compartment poses a greater risk of injury to occupants than does the actual impingement point 301 at the trunk. The safety system thus decides against triggering the automatic braking operation.

Figure 4:
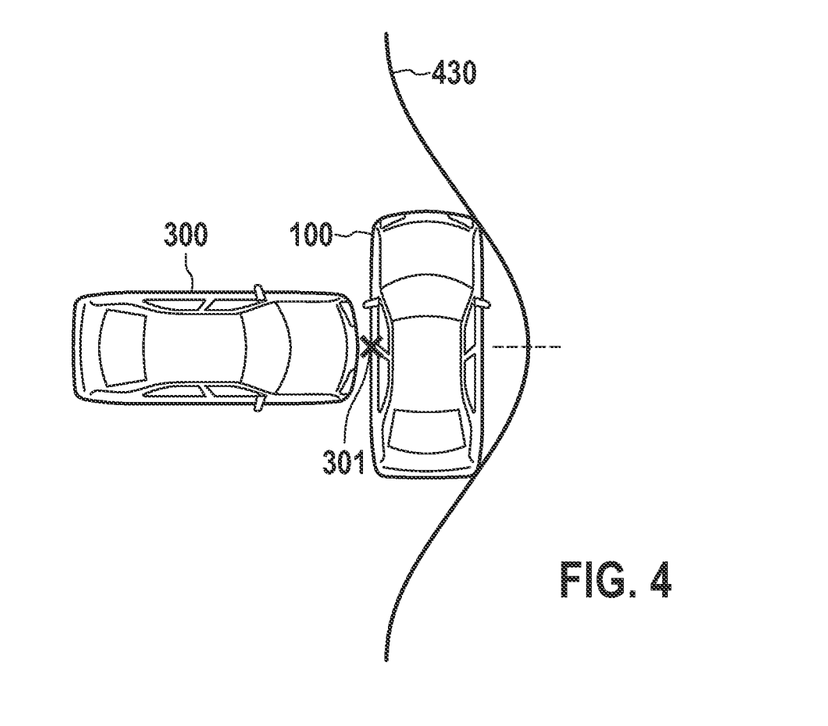
FIG. 4 schematically depicts an impingement point of a collision object on a vehicle, in accordance with an exemplifying embodiment of the present invention.

FIG. 4 schematically depicts an impingement point 301 of a collision object 300 on a vehicle 100, in accordance with an exemplifying embodiment. Vehicle 100 corresponds to or resembles the vehicle of FIG. 1. FIG. 4 further shows, for illustration, a plurality of probability values 430 for a location of impingement point 301 relative to subregions referred to vehicle 100 in the form of a probability distribution, in this case (merely by way of example) as a normal distribution. The normal distribution is plotted along a longitudinal side of vehicle 100, and centered at a center of the vehicle.

In other words, FIG. 4 shows an example of an ascertained or estimated impingement point 301 at the passenger compartment of vehicle 100, for example after an autonomous braking operation of vehicle 100. The normal distribution shows, or probability values 430 show, the uncertainty of the location of impingement point 301. In this example there is a high probability that a real impingement point is located outside a region of the passenger compartment, for example in the front region or in the region of the trunk of vehicle 100.

Figure 5:
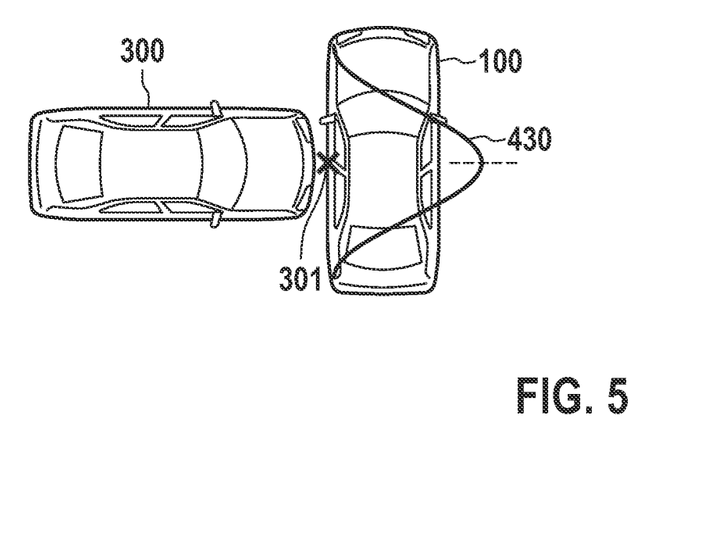
FIG. 5 schematically depicts an impingement point of a collision object on a vehicle, in accordance with an exemplifying embodiment of the present invention.

FIG. 5 schematically depicts an impingement point 301 of a collision object 300 on a vehicle 100, in accordance with an exemplifying embodiment. Vehicle 100 corresponds to or resembles the vehicle of FIG. 1. The depiction in FIG. 5 corresponds to the depiction of FIG. 4, except that the probability distribution or normal distribution by way of which probability values 430 are represented has a lower standard deviation than the one in FIG. 4.

In other words, FIG. 5 shows an example of an ascertained or estimated impingement point 301 at the passenger compartment after an autonomous emergency braking operation of vehicle 100. The normal distribution shows the uncertainty of the location of impingement point 301. In this example, there is a high probability that a real impingement point is located in the region of the passenger compartment of vehicle 100. The probability that impingement point 301 is located in the region of the front, or the trunk, of vehicle 100, is low.

Figure 6:
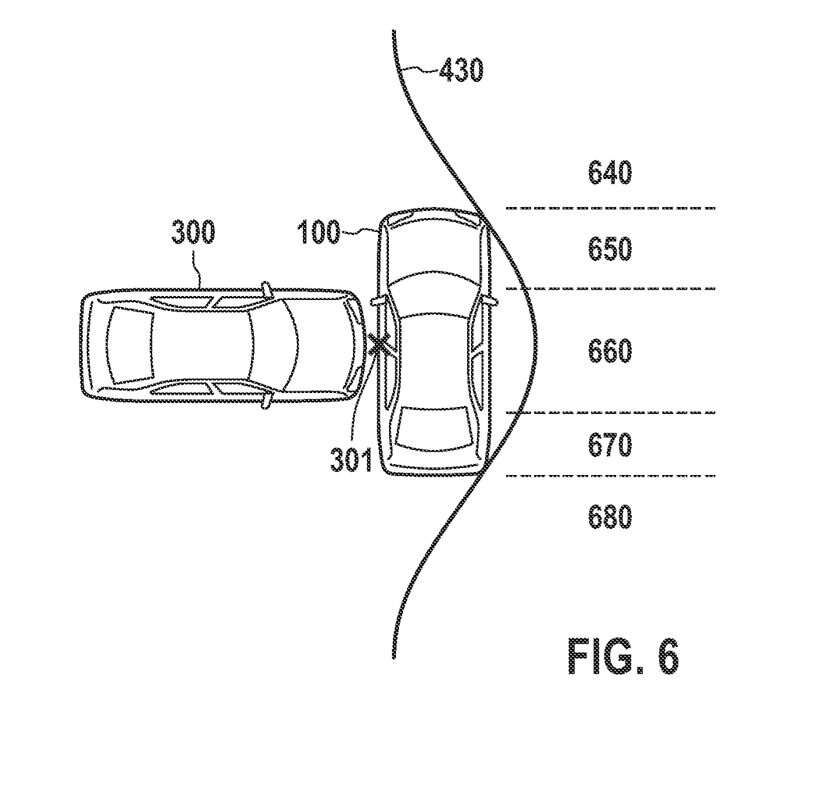
FIG. 6 schematically depicts an impingement point of a collision object on a vehicle, in accordance with an exemplifying embodiment of the present invention.

FIG. 6 schematically depicts an impingement point 301 of a collision object 300 on a vehicle 100, in accordance with an exemplifying embodiment. Vehicle 100 corresponds to or resembles the vehicle of FIG. 1. The depiction in FIG. 6 corresponds to the depiction of FIG. 4 except that exemplifying subregions 640, 650, 660, 670, and 680 referred to vehicle 100 are additionally depicted in FIG. 6. FIG. 6 thus shows probability values 430 of a probability for a location of a real impingement point in several exemplifying subregions 640, 650, 660, 670, and 680.

A first subregion 640 encompasses a region outside a front of vehicle 100. First subregion 640 has, for example, a first probability value associated with it. A second subregion 650 encompasses a front region of vehicle 100. Second subregion 650 has, for example, a second probability value associated with it. A third subregion 660 encompasses a passenger compartment of vehicle 100. Third subregion 660 has, for example, a third probability value associated with it. A fourth subregion 670 encompasses a trunk region or rear-end region of vehicle 100. Fourth subregion 670 has, for example, a fourth probability value associated with it. A fifth subregion 680 encompasses a region outside a rear end of vehicle 100. Fifth subregion 680 has, for example, a fifth probability value associated with it.

Referring to the Figures described above, examples and exemplifying embodiments will be briefly explained again in summary fashion and using different words.

Let it be assumed, for example, that a front cross traffic assist (FCTA) function of the vehicle predicts that an automatic braking operation of host vehicle 100 will cause impingement point 301 to be displaced from the trunk of host vehicle 100 to the passenger compartment. Safety system 110 will therefore suppress activation of the intervention by safety device 115. If impingement point 301 has been estimated using uncertain input data, however, the ascertained location of impingement point 301 with and without automatic braking is also uncertain. An ascertained displacement of impingement point 301 and a real displacement of impingement point 301 might therefore differ from one another. For example, instead of an ascertained displacement of impingement point 301 from the trunk to the passenger compartment, the real displacement of impingement point 301 might occur from the passenger compartment to the front of host vehicle 100. This displacement of impingement point 301 from the passenger compartment to the front would be desirable, and would be permitted by safety system 110. In addition, a decrease in collision energy due to a braking operation is advantageous in general and should be weighed against the possible advantage of a suppression of an activation. If safety system 110 thus detects an uncertain displacement of impingement point 301 from the trunk to the passenger compartment, it might nevertheless be better to activate the automatic braking operation or autonomous emergency braking operation, since the braking operation decreases collision energy. Safety system 110, more precisely apparatus 120, calculates the uncertainty of the ascertained impingement point 301 and uses it to improve a system behavior.

Safety system 110 functions in conjunction with an assistance function, such as FCTA, for collision estimation and collision avoidance. The collision estimation system or safety system 110 calculates the location of impingement point 301 between host vehicle 100 and the target vehicle or collision object 300. Safety system 110, more precisely apparatus 120, additionally calculates the uncertainty of the location of impingement point 301. The uncertainty calculation is based on the uncertainty of the input data, i.e. environment data 103 and trip data 105, and the uncertainty regarding future actions of collision object 300 or the collision opponent, in particular in terms of a reaction of a driver of the target vehicle or collision object 300. Safety system 110 then uses the uncertainty of the ascertained impingement point 301 to improve system decisions, for example in terms of whether the automatic system reaction (for instance, braking) is to be suppressed because of a disadvantageous displacement of impingement point 301 or whether the automatic system reaction should be triggered at all, for instance if there is a high probability that the real impingement point is located outside host vehicle 100; and/or to decide what the suitable system reaction is, for instance braking more gently if impingement point 301 is statistically uncertain in terms of its location, and braking more strongly if impingement point 301 is statistically certain in terms of its location.

If an exemplifying embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for controlling a safety device of a vehicle, the safety device being configured to react to an imminent collision of the vehicle with a collision object by way of an intervention in a longitudinal and/or lateral guidance of the vehicle, the method comprising the following steps:
    reading in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;
    ascertaining: (i) a first expected impingement point of the collision object on the vehicle using the environment data and the trip data, (ii) a second expected impingement point of the collision object on the vehicle using the environment data, the trip data, and the intervention data, (iii) at least one uncertainty value of the first and second impingement points using the environment data and the trip data, and (iv) at least one probability value for a location of at least one of the first and second impingement points relative to subregions referred to the vehicle, using the at least one uncertainty value;
    executing an evaluation of the location of the first expected impingement point and of the location of the second expected impingement point relative to the subregions using the at least one probability value and reference data that define, for each subregion of the subregions, an evaluation factor that depends on an effect of a location of an expected impingement point in the subregion on a safety status of at least one occupant of the vehicle; and
    generating, depending on a result of the evaluation, a control signal for output to an interface to the safety device, the control signal having at least one control parameter for controlling the safety device.

2. The method as recited in claim 1, wherein reference data including reference that define, for at least one subregion in a region of a passenger compartment of the vehicle, a first evaluation factor that represents an effect having a first damage potential, and define, for at least one subregion outside the region of the passenger compartment, a second evaluation factor that represents an effect having a second damage potential, the first reference data being used in the executing step, the first damage potential being greater than the second damage potential.

3. The method as recited in claim 1, wherein the reference data include first whose evaluation factors depend on a collision-related deformation of a sub-portion of the vehicle in at least one of the subregions, the first reference data being used in the executing step.

4. The method as recited in claim 1, wherein in the generating step, the control signal is generated with at least one control parameter that brings about an enabling or a suppression of the planned intervention of the safety device.

5. The method as recited in claim 1, wherein in the generating step, the control signal is generated with at least one control parameter that brings about a modification of the planned intervention of the safety device.

6. The method as recited in claim 1, wherein in the generating step, the control signal is generated with at least one control parameter that brings about control of a duration and/or of an amplitude of the planned intervention of the safety device.

7. An apparatus configured to control a safety device of a vehicle, the safety device being configured to react to an imminent collision of the vehicle with a collision object by way of an intervention in a longitudinal and/or lateral guidance of the vehicle, the apparatus configured to:
    read in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;

ascertain: (i) a first expected impingement point of the collision object on the vehicle using the environment data and the trip data, (ii) a second expected impingement point of the collision object on the vehicle using the environment data, the trip data, and the intervention data, (iii) at least one uncertainty value of the first and second impingement points using the environment data and the trip data, and (iv) at least one probability value for a location of at least one of the first and second impingement points relative to subregions referred to the vehicle, using the at least one uncertainty value;

execute an evaluation of the location of the first expected impingement point and of the location of the second expected impingement point relative to the subregions using the at least one probability value and reference data that define, for each subregion of the subregions, an evaluation factor that depends on an effect of a location of an expected impingement point in the subregion on a safety status of at least one occupant of the vehicle; and generate, depending on a result of the evaluation, a control signal for output to an interface to the safety device, the control signal having at least one control parameter for controlling the safety device.

8. A safety system for a vehicle, the safety system comprising:

a safety device of the vehicle, wherein the safety device is configured to react to an imminent collision of the vehicle with a collision object by way of an intervention in a longitudinal and/or lateral guidance of the vehicle; and an apparatus that is connected to the safety device such that a control signal is transferrable from the apparatus to the safety device, wherein the apparatus is configured to:

read in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;

ascertain: (i) a first expected impingement point of the collision object on the vehicle using the environment data and the trip data, (ii) a second expected impingement point of the collision object on the vehicle using the environment data, the trip data, and the intervention data, (iii) at least one uncertainty value of the first and second impingement points using the environment data and the trip data, and (iv) at least one probability value for a location of at least one of the first and second impingement points relative to subregions referred to the vehicle, using the at least one uncertainty value;

execute an evaluation of the location of the first expected impingement point and of the location of the second expected impingement point relative to the subregions using the at least one probability value and reference data that define, for each subregion of the subregions, an evaluation factor that depends on an effect of a location of an expected impingement point in the subregion on a safety status of at least one occupant of the vehicle; and generate, depending on a result of the evaluation, the control signal for output to an interface to the safety device, the control signal having at least one control parameter for controlling the safety device.

9. A non-transitory machine-readable storage medium on which is stored a computer program for controlling a safety device of a vehicle, the safety device being configured to react to an imminent collision of the vehicle with a collision object by way of an intervention in a longitudinal and/or lateral guidance of the vehicle, the computer program, when executed by a computer, causing the computer to perform the following steps:

reading in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding a planned intervention of the safety device;

ascertaining: (i) a first expected impingement point of the collision object on the vehicle using the environment data and the trip data, (ii) a second expected impingement point of the collision object on the vehicle using the environment data, the trip data, and the intervention data, (iii) at least one uncertainty value of the first and second impingement points using the environment data and the trip data, and (iv) at least one probability value for a location of at least one of the first and second impingement points relative to subregions referred to the vehicle, using the at least one uncertainty value;

executing an evaluation of the location of the first expected impingement point and of the location of the second expected impingement point relative to the subregions using the at least one probability value and reference data that define, for each subregion of the subregions, an evaluation factor that depends on an effect of a location of an expected impingement point in the subregion on a safety status of at least one occupant of the vehicle; and generating, depending on a result of the evaluation, a control signal for output to an interface to the safety device, the control signal having at least one control parameter for controlling the safety device.

* * * * *